United States Patent Office 3,000,912
Patented Sept. 19, 1961

3,000,912
2α-SUBSTITUTED METHYL ANDROSTANES
Lawrence H. Knox, Mexico City, Mexico, assignor to Syntex, S.A., Mexico City, Mexico, a corporation of Mexico
No Drawing. Filed Jan. 4, 1961, Ser. No. 80,528
Claims priority, application Mexico Jan. 6, 1960
18 Claims. (Cl. 260—397.4)

The present invention relates to novel cyclopentanophenanthrene compounds and to a process for the production thereof.

More particularly the present invention relates to the dihydroallotestosterone and 19-nordihydroallotestosterone having a hydroxymethyl, alkoxymethyl, aralkoxymethyl or acyloxymethyl group at C–2 and which may also contain an acyloxy group at C–17β and a saturated aliphatic hydrocarbon group at C–17α.

The novel compounds of the present invention which are valuable anabolic agents having a favourable anabolic-androgenic ratio and which show a high degree of pituitary suppression activity are represented by the following formula:

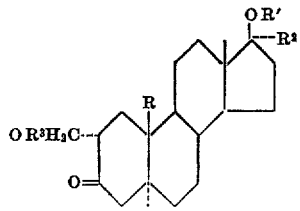

In the above formula, R represents hydrogen or methyl; R' represents hydrogen or the acyl radical of a hydrocarbon carboxylic acid; $R^2$ represents hydrogen or a lower alkyl group such as methyl, ethyl or propyl, and $R^3$ represents hydrogen, a lower alkyl group, an aralkyl group containing up to 12 carbon atoms or the acyl radical of a hydrocarbon carboxylic acid.

The acyl group is derived from a hydrocarbon carboxylic acid of less than 12 carbon atoms which may be saturated, unsaturated, of straight, branched, cyclic or cyclic-aliphatic chain, aromatic and may be substituted by functional groups such as hydroxy, alkoxy of up to 5 carbon atoms, acyloxy of up to 8 carbon atoms, amino, nitro, or halogen. Typical ester groups are the acetate, propionate, butyrate, caproate, enanthate, trimethylacetate, t-butylacetate, phenoxyacetate, hemisuccinate, cyclopentylpropionate, aminoacetate, benzoate and β-chloropropionate.

The novel compounds of the present invention are prepared from 2-hydroxymethylene-androstanes by the absorption of one molecular equivalent of hydrogen under controlled conditions of hydrogenation. It has not been previously possible to effect the hydrogenation of the hydroxymethylene group at C–2 with the absorption of only one molecular equivalent of hydrogen; there were always absorbed two molecular equivalents of hydrogen with the formation of the corresponding 2α-methyl compounds which are valuable hormones having a different effect than the novel 2-hydroxymethyl compounds.

The novel compounds of the present invention may be prepared by a process illustrated by the following equation:

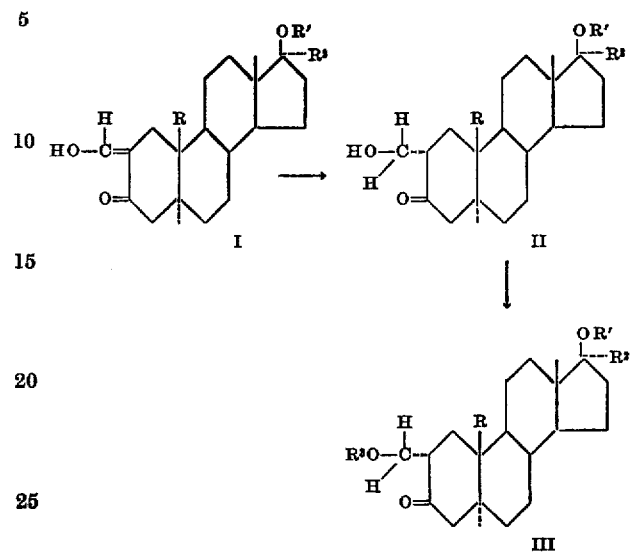

In the above formulas R, R', $R^2$ and $R^3$ have the same meaning as previously described.

In practicing the process outlined above, a 2-hydroxymethylene dihydrotestosterone (I) prepared as described in U.S. Patent 2,908,693 and by Ringold et al., J. Am. Chem. Soc. 81, 427 (1959), is hydrogenated in the presence of a hydrogenation catalyst and inert solvent at a pH between 6.9 and 7.2 until one molecular equivalent of hydrogen is absorbed to form the corresponding 2α-hydroxymethyl compound (II). Suitable solvents for the hydrogenation step are lower aliphatic alcohols such as methanol, ethanol, propanol, isopropanol, butanol, t-butanol, n-butanol, 2-butanol or a solvent such as ethyl acetate, acetone, tetrahydrofuran or other similar solvent. Hydrogenation catalysts such as palladium on carbon or palladium on barium sulfate are preferred. Variation in temperature, pressure and catalyst have a minor effect on the course of the reaction. However, it is most critical to maintain the reaction at the designated pH range otherwise it is difficult to stop the hydrogenation after the absorption of one equivalent of hydrogen with the result that invariably there is obtained the 2α-methyl compounds instead of the 2-hydroxymethyl compounds. An excess of hydrogen will not affect the formation of the 2-hydroxymethyl compounds if the pH range of 6.9 to 7.2 is maintained.

The 2-hydroxymethyl compound (II) can be esterified by conventional methods with hydrocarbon carboxylic acid anhydrides or chlorides to form monoesters (III: $R^2$=alkyl) or diesters thereof (III: $R^3$= hydrogen). By hydrogenating a 17-monoester of 2-hydroxymethylene-dihydrotestosterone or of a 17α-alkyl derivative thereof (I), there is obtained the corresponding 17-monoester of the 2-hydroxymethyl compound (II) which upon conventional esterification affords the 2,17-diester derivative (III). By hydrogenating a 2-hydroxymethylene dihydrotestosterone (I:$R^2$=hydrogen), there is obtained the corresponding 2-hydroxymethyl derivative (II: $R^2$=hydrogen) which upon conventional esterification results in the formation of the diester. Conventional esterification of a 2-hydroxymethyl-17α-alkyl dihydrotestosterone results in the formation of the C–2 monoester which can be further esterified by reaction with the desired acid anhydride in benzene solution in the presence of p-toluenesulfonic acid or by heating with the desired acid anhydride in pyridine solution at 90° C. for at least 24 hours to form the C–2, C–17-diester.

Alternatively, the 2-hydroxymethyl compound (II) can be etherified at C–2 by reaction with an alkanol in the presence of perchloric acid or by heating with an alkyl or aralkyl halide, preferably the iodide, in a solvent such as acetone and in the presence of a base to form the compound III where $R^3$ is alkyl or aralkyl.

In another aspect of the present invention the novel compounds containing an ether group at C–2 may be prepared by a process illustrated by the following equation:

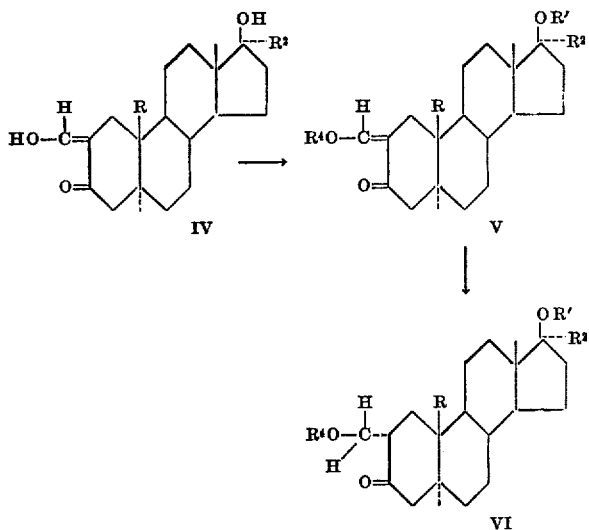

In the above formulas R, R' and $R^2$ have the same meaning as previously described and $R^4$ represents a lower alkyl or aralkyl group.

In practicing the process outlined above, a 2-hydroxymethylene dihydroallotestosterone (IV) is first etherified at C–2 as previously described to form the 2-alkoxymethylene or 2-aralkoxymethylene derivative (V). The latter is then hydrogenated in the presence of a solvent such as methanol or ethanol and in the presence of a hydrogenation catalyst such as pre-reduced palladium on carbon or palladium on barium sulfate at room temperature and under atmospheric pressure until one molecular equivalent of hydrogen is absorbed to afford the corresponding 2α-alkoxymethyl or 2α-aralkoxymethyl compounds (VI). The hydroxy group at C–17β may be esterified prior to or subsequent to the hydrogenation by the conventional methods known in the art.

The following examples serve to illustrate but are not intended to limit the scope of the invention:

PREPARATION 1

*17-monoacetate of 2-hydroxymethylen-androstan-17β-ol-3-one*

1 g. of 2-hydroxymethylen-androstan-17β-ol-3-one disclosed by Ringold et al., J. Am. Chem. Soc. 81, 427 (1959) was treated with 2 cc. of acetic anhydride in 10 cc. of pyridine at room temperature overnight, then it was poured into water; the precipitate was filtered, washed with water and then stirred with 50 cc. of a 5% methanolic solution of potassium hydroxide at 0° and for 5 minutes. It was immediately acidulated by addition of acetic acid, concentrated to a small volume under reduced pressure and the precipitate was filtered. There was afforded the 17-monoacetate of 2-hydroxymethylen-androstan-17β-ol-3-one; which was purified by recrystallization in acetone-hexane.

PREPARATION 2

According to the method described in Preparation 1, there were obtained other 17-monoesters by reaction with the respective anhydrides. Thus for example, the 17-monopropionate, the 17-monocaproate and the 17-monocyclopentylpropionate of 2-hydroxymethylen-androstan-17β-ol-3-one were obtained by using propionic acid anhydride, caproic acid anhydride and cyclopentylpropionic acid anhydride respectively. Where the acid anhydride contained more than 3 carbon atoms, the amount of the anhydride and the reaction time were doubled and the treatment with methanolic potassium hydroxide was extended until about 15 minutes.

PREPARATION 3

*17-monoacetate of 2-hydroxymethylene-17α-methyl-androstan-17β-ol-3-one*

1 g. of 2-hydroxymethylene-17α-methyl-androstan-17β-ol-3-one [see Ringold et al., J. Am. Chem. Soc. 81, 427 (1959) was refluxed with 2 cc. of acetic anhydride in 10 cc. of pyridine for 12 hours, at the end of which time it was poured into ice water, and extracted with ethyl acetate. The extract was washed with dilute hydrochloric acid, then with a 5% aqueous solution of sodium bicarbonate and finally with water to neutral, dried over anhydrous sodium sulfate and concentrated to dryness, affording the crude diacetate of 2-hydroxy-methylene-17α-methyl-androstan-17β-ol-3-one. The diacetate was then stirred with 50 cc. of a 1% methanolic solution of potassium hydroxide, at 5° C. for half an hour, at the end of which period it was acidulated by addition of acetic acid, concentrated to a small volume and diluted with ice water. The solid was filtered and purified by recrystallization in acetone-hexane and there was afforded the 17-monoacetate of 2-hydroxymethylene-17α-methyl-androstan-17β-ol-3-one.

PREPARATION 4

17-monoesters of the 2-hydroxymethylene-17α-methyl-androstan 17β-ol-3-one other than the acetate were obtained by following the method described in Preparation 3, but using instead of acetic anhydride, the anhydride of another carboxylic acid of up to 12 carbon atoms. Particularly, there were prepared the 17-propionate, 17-caproate and 17-cyclopentylpropionate of 2-hydroxymethylene-17α-methyl-androstan-17β-ol-3-one.

PREPARATION 5

17-monoesters of 2-hydroxymethylene-17α-ethyl-androstan-17β-ol-3-one were obtained by following the methods of Preparations 3 and 4; starting from 2-hydroxymethylene-17α-ethyl-androstan-17β-ol-3-one, there were especially prepared the 17-acetate, 17-propionate, 17-caproate and 17-cyclopentylpropionate of 2-hydroxymethylene-17α-ethyl-androstan-17β-ol-3-one.

PREPARATION 6

10 g. of 19-nor-androstan-17β-ol-3-one in mixture with 125 ml. of benzene, 10 ml. of ethyl formate and 1.9 g. of sodium methoxide were kept for one day at room temperature under an atmosphere of nitrogen. The precipitate was filtered, washed with benzene, then hexane and dried in vacuo. The dried powder was added in portions with stirring to a cold solution of 25 ml. of concentrated hydrochloric acid in 250 ml. of water. The mixture was stirred for 30 minutes the precipitate filtered, washed with water, dried and crystallized from ethyl acetate to give 2-hydroxymethylene-19-nor-androstan-17β-ol-3-one.

PREPARATION 7

By following the procedure described in Preparation 6 except that 17α-ethyl-19-nor-androstan-17β-ol-3-one was employed as the starting material, there was finally obtained 2 - hydroxymethylene-17α-ethyl-19-nor-androstan-17β-ol-3-one.

PREPARATION 8

By following the method disclosed by Ringold et al., J. Am. Chem. Soc. 81, 427 (1959), 17α-propyl-19-nor-androstan-17β-ol-3-one was transformed into 2-hydroxymethylene-17α-propyl-19-nor-androstan-17β-ol-3-one.

PREPARATION 9

By following the procedure described in Preparations 1 and 2 except that the 2-hydroxymethylen-androstan-17β-ol-3-one was substituted by the corresponding 19-nor compound, there was obtained the 17-monoacetate, 17-monopropionate, 17-monocaproate and 17-monocyclopentylpropionate of 2-hydroxymethylene-19-nor-androstan-17β-ol-3-one.

PREPARATION 10

By following the methods of Preparations 3 and 4, 2-hydroxymethylene-17α-methyl-19-nor-androstan-17β-ol-3-one was converted into its 17-monoacetate, 17-monopropionate, 17-monocaproate and 17-monocyclopentylpropionate.

In a similar manner there were formed the 17-monoacetate, 17-monopropionate, 17-monocaproate and 17-monocyclopentylpropionate of 2-hydroxymethylene-17α-ethyl-19-nor-androstan-17β-ol-3-one and of 2-hydroxymethylene-17α-propyl-19-nor-androstan-17β-ol-3-one.

EXAMPLE I

In 200 cc. of methanol (distilled over potassium hydroxide) containing 6 g. of pre-reduced 5% palladium on carbon, there was suspended 20 g. of 2-hydroxymethylene-17α-methyl-androstan-17β-ol-3-one, disclosed by Ringold et al., J. Am. Chem. Soc. 81, 427 (1959). The mixture was hydrogenated under initial pressure of 30 pounds until 1 molar equivalent of hydrogen was absorbed. The catalyst was filtered, the filtrate was evaporated to dryness under reduced pressure, and the residue was purified by chromatography on neutral alumina; a small quantity of 2α,17α-dimethyl-androstan-17β-ol-3-one was eluted with benzene. By subsequent elution with benzene-ether (4:1) there was obtained 16.7 g. of 2α-hydroxymethyl-17α-methyl-androstan-17β-ol-3-one; M.P. 205–206° C., [α]$_D$ +20 (chloroform).

EXAMPLE II

By following the procedure described in the foregoing example, there was obtained from 2-hydroxymethylen-androstan-17β-ol-3-one [disclosed by Ringold et al., J. Am. Chem. Soc. 81, 427 (1959)] the novel 2α-hydroxymethyl-androstan-17β-ol-3-one; M.P. 190–192°; [α]$_D$ +36 (chloroform).

EXAMPLE III

By substituting in Example 1 the 2-hydroxymethylen-androstan-17β-ol-3-one by the 19-nor derivative, there was obtained 2α - hydroxymethyl-19-nor-androstan-17β-ol-3-one.

In a similar manner from 2-hydroxymethylene-17α-methyl-19-nor-androstan-17β-ol-3-one, disclosed by Ringold et al., J. Am. Chem. Soc. 81, 427 (1959) there was obtained 2α-hydroxymethyl-17α-methyl-19-nor-androstan-17β-ol-3-one.

EXAMPLE IV 1 g. of 2α-hydroxymethyl-17α-methyl-androstan-17β-ol-3-one, prepared according to Example I, was treated with 1 cc. of acetic anhydride in 5 cc. of pyridine at room temperature, and allowed to remain overnight. The mixture was poured into water, heated for half an hour on the steam bath and cooled; the precipitate was filtered, washed with water, dried and recrystallized in acetone-hexane. Thus there was obtained 2α-acetoxy-methyl-17α-methyl-androstan-17β-ol-3-one, M.P. 129–131° C.

By substituting the 2α-hydroxymethyl-17α-methyl-androstan-17β-ol-3-one by 2α-hydroxymethyl-17α-methyl-19-nor-androstan-17β-ol-3-one, there was obtained 2α-acetoxymethyl-17α-methyl-19-nor-androstan - 17β - ol-3-one.

EXAMPLE V 1 g. of 2α-hydroxymethyl-androstan-17β-ol-3-one was treated according to the method described in Example IV, but using 2 cc. of acetic anhydride to produce finally 2α-acetoxymethyl-17β-acetoxy-androstan-3-one.

In a similar manner, 2α-hydroxymethyl-19-nor-androstan-17β-ol-3-one was converted into 2α-acetoxymethyl-17β-acetoxy-19-nor-androstan-3-one.

EXAMPLE VI

By following the methods of Examples IV and V there were treated 2α-hydroxymethyl-17α-methyl-androstan-17β-ol-3-one and 2α-hydroxymethyl-androstan-17β-ol-3-one, respectively, with the anhydrides of propionic, caproic and cyclopentylpropionic acids; however, the quantity of the two latter anhydrides was doubled. Thus there were finally obtained the monopropionates, monocaproates and monocyclopentylpropionates of 2α-hydroxymethyl-17α-methyl-androstan-17β-ol-3-one as well as the dipropionates, dicaproates and dicyclopentylpropionates of the 2α-hydroxymethyl-androstan-17β-ol-3-one.

EXAMPLE VII 1 g. of 2α-hydroxymethyl-17α-methyl-androstan-17β-ol-3-one was heated with 5 cc. of acetic anhydride in 20 cc. of pyridine at 90° C. and for 24 hours, at the end of which time it was poured into water, heated for half an hour on the steam bath, and cooled; the precipitate was filtered, washed with water, dried and recrystallized from acetone-hexane to afford the diacetate of 2α-hydroxymethyl - 17α-methyl-androstan-17β-ol-3-one, i.e. 2α - acetoxymethyl-17β-acetoxy-17α-methyl-androstan-3-one.

EXAMPLE VIII

According to the method of Example VII, there were used, instead of acetic anhydride, the anhydrides of propionic, caproic and cyclopentylpropionic acids; however, the quantity of the latter two acid anhydrides was doubled and the time of esterification increased to approximately 48 hours. Thus there were obtained the dipropionates, dicaproates and dicyclopentylpropionates, respectively, of 2α-hydroxymethyl-17α-methyl-androstan-17β-ol-3-one.

EXAMPLE IX

By following the methods of Examples VII and VIII, starting from the 2α-acyloxymethyl-17α-methylandrostan-17β-ol-3-ones of Examples IV and VI and using for the esterification at C–17 the anhydride of an acid different from the acid formed by the 2α-acyloxymethyl group, there were obtained the following diesters of 2α-hydroxymethyl-17α-methyl-androstan-17β-ol-3-one; the 2α - acetoxymethyl-17α-methyl-17β-propionoxy - androstan-3-one, the 2α - acetoxymethyl-17α-methyl-17β-capronoxy-androstan-3-one, the 2α - acetoxymethyl-17α-methyl-17β-cyclopentylpropionoxy-androstan - 3 - one, the 2α-propionoxymethyl-17α-methyl-17β-acetoxy-androstan-3-one, 2α-propionoxymethyl-17α-methyl-17β-capronoxy - androstan-3-one, 2α-propionoxymethyl - 17α - methyl-17β-cyclopentylpropionoxy-androstan - 3 - one, 2α-capronoxymethyl-17α-methyl-17β-acetoxy-androstan-3-one, 2α-capronoxymethyl-17α-methyl-17β-propionoxyandrostan-3-one, 2α-capronoxymethyl - 17α - methyl - 17β - cyclopentylpropionoxyandrostan-3-one, the 2α - cyclopentylpropionoxymethyl-17α-methyl-17β-acetoxy-androstan-3-one, 2α-cyclopentylpropionoxymethyl - 17α - methyl-17β-propionoxy-androstan - 3 - one and 2α-cyclopentylpropionoxymethyl-17α-methyl-17β-capronoxy-androstan-3-one.

EXAMPLE X

The 2α-acetoxymethyl-17β-acetoxy, 2α-acetoxymethyl-17β-propionoxy, 2α-acetoxymethyl-17β-capronoxy and 2α-acetoxymethyl-17β-cyclopentylpropionoxy - derivatives of 17α-methyl-androstan-3-one, prepared according to Examples VII and IX, were treated with a methanolic solution of potassium hydroxide to hydrolyze selectively the ester group formed with the hydroxymethyl group. Preferentially, thus 1 g. of the diester was treated with 50 cc. of 1% methanolic solution of potassium hydroxide at room temperature for 4 hours, then neutralized by addition of acetic acid, concentrated to a small volume at reduced pressure, and diluted with water; the precipitate was filtered, washed with water, dried and recrystallized from acetone-hexane. There were thus obtained the 17-acetate, 17-propionate, 17-caproate and 17-cyclopentylpropionate of 2α - hydroxymethyl-17α-methyl-androstan-17β-ol-3-one.

EXAMPLE XI

The methods described in Examples I, IV, VI, VII, VIII, IX and X were applied to the corresponding starting compounds which had at C–17α, instead of a methyl group, an ethyl group and there was produced the corresponding final products having the ethyl group at C–17α.

EXAMPLE XII

By following the method described in Example I, the 2-hydroxymethylene-derivatives of the following compounds were hydrogenated: 17-acetate, 17-propionate, 17-caproate and 17-cyclopentylpropionate of androstan-17β-ol-3-one, 17α - methyl - androstan-17β-ol-3-one and 17α-ethyl-androstan-17β-ol-3-one. Thus there were obtained the 2α-hydroxymethyl derivatives of the foregoing compounds with the respective ester group at C–17β.

EXAMPLE XIII

By following the method described in Example VI, 2α-hydroxymethyl-17α-methyl - 19 - nor-androstan-17β-ol-3-one and 2α-hydroxymethyl-19-nor-androstan-17β-ol-3-one were converted into the propionate, caproate and cyclopentylpropionate of 2α-hydroxymethyl-17α-methyl-19-nor-androstan-17β-ol-3-one as well as the dipropionate, dicaproate and dicyclopentylpropionate of 2α-hydroxymethyl-19-nor-androstan-17β-ol-3-one.

EXAMPLE XIV

By following the methods described in Examples VII and VIII, 2α-hydroxymethyl - 17α - methyl-19-nor-androstan-17β-ol-3-one was converted into 2α-acetoxymethyl-17β - acetoxy-17α-methyl-19-nor-androstan-3-one, 2α-propionoxymethyl - 17β - propionoxy-17α-methyl-19-nor-androstan-3-one, 2α - capronoxymethyl-17β-capronoxy-17α-methyl-19-nor-androstan-3-one and 2α-cyclopentylpropionoxy - 17β - cyclopentylpropionoxy-17α-methyl-19-nor-androstan-3-one identical with the compounds obtained in Example XIII.

EXAMPLE XV

By following the methods of Example IX, starting from the 2α-acyloxymethyl-17α-methyl-19-nor-androstan-17β-ol-3-ones of Examples IV and XIII, there were obtained 2α - acetoxymethyl-17α-methyl-17β-propionoxy-19-nor-androstan-3-one, 2α - acetoxymethyl-17α-methyl-17β-capronoxy-19-nor-androstan-3-one, 2α-acetoxymethyl-17α-methyl - 17β - cyclopentylpropionoxy-19-nor-androstan-3-one, 2α - propionoxymethyl-17α-methyl-17β-acetoxy-19-nor-androstan-3-one, 2α - propionoxymethyl-17α-methyl-17β - capronoxy-19-nor-androstan-3-one, 2α-propionoxymethyl - 17α - methyl-17β-cyclopentylpropionoxy-19-nor-androstan-3-one, 2α - capronoxymethyl-17α-methyl-17β-acetoxy - 19 - nor-androstan-3-one, 2α-capronoxymethyl-17α - methyl-17β-propionoxy-19-nor-androstan-3-one, 2α-capronoxymethyl - 17α - methyl-17β-cyclopentylpropionoxy-19-nor-androstan-3-one, 2α - cyclopentylpropionoxymethyl - 17α - methyl - 17β - acetoxy-19-nor-androstan-3-one, 2α - cyclopentylpropionoxymethyl-17α-methyl-17β-propionoxy-19-nor-androstan-3-one and 2α-cyclopentylpropionoxymethyl - 17α - methyl-17β-capronoxy-19-nor-androstan-3-one.

EXAMPLE XVI

By following the procedure described in Example X, the 2α-acetoxymethyl-17β-acetoxy-17α-methyl-19-nor-androstan - 3 - one; 2α - acetoxymethyl - 17β - propionoxy-17α - methyl - 19 - nor - androstan - 3 - one; 2α - acetoxymethyl - 17β - capronoxy - 17α - methyl - 19 - nor -androstan-3-one and 2α-acetoxymethyl-17β-cyclopentylpropionoxy - 17α - methyl - 19 - nor - androstan - 3 - one were selectively hydrolyzed at C–2 to form the corresponding 2α - hydroxymethyl - 17β - acyloxy - 17α - methyl-19-nor-androstan-3-ones.

EXAMPLE XVII

The methods of Examples I, IV, VI, VII, VIII, IX, and X were applied to the corresponding starting 19-nor-androstan-3-ones having an ethyl or a propyl group at C–17α and there were produced the corresponding final products having an ethyl or propyl group at C–17α.

EXAMPLE XVIII

By following the method described in Example I, the 2-hydroxymethylene derivatives of the following compounds were hydrogenated: 17-acetate, 17-propionate, 17-caproate and 17-cyclopentylpropionate of 19-nor-androstan-17β-ol-3-one, of 17-methyl-19-nor-androstan-17β-ol-3-one, of 17α-ethyl-19-nor-androstan-17β-ol-3-one, and of 17α-propyl-19-nor-androstan-17β-ol-3-one. Thus there were obtained the 2α-hydroxymethyl derivatives of the foregoing compounds with the respective ester groups at C–17β.

EXAMPLE XIX 10. g. of 2-hydroxymethylen-androstan-17β-ol-3-one was suspended in 100 ml. of methanol and 2 drops of 70% perchloric acid were added at 20° C., and the mixture was stirred at this temperature, whereby rapid dissolution of the starting steroid, followed by precipitation of the etherified compound was noted. The mixture was then left for 5 minutes at 20°, subsequently chilled to 0° and the solid collected by filtration, washed with water, dried and purified by crystallization from acetone-hexane. Thus, 8.3 g. of 2-methoxymethylen-androstan-17β-ol-3-one [M.P.] 199–200° C., [α]$_D$ +15.35° (chloroform), λ$_{max}$ 278 mμ log ε 4.00], were obtained.

5 g. of 2-methoxymethylen-androstan-17β-ol-3-one dissolved in 200 cc. of methanol (distilled over potassium hydroxide) containing 500 mg. of a pre-reduced 5% palladium on carbon catalyst were hydrogenated at room temperature and under atmospheric pressure; after uptake of 1 molecular equivalent of hydrogen the reaction came practically to a standstill. The catalyst was separated by filtration and the filtrate evaporated to dryness under reduced pressure. The residue crystallized from acetone, yielding 4 g. of 2α-methoxymethyl-androstan-17β-ol-3-one, M.P. 180–181° C., [α]$_D$ +30° (chloroform).

EXAMPLE XX 5 g. of 2-hydroxymethylene-19-nor-androstan-17β-ol-3-one was transformed to 2-methoxymethylene-19-nor-androstan-17β-ol-3-one and this, in its turn, hydrogenated, following the technique described in Example XIX. Thus, 2α - methoxymethyl - 19 - nor -androstan - 17β - ol - 3-one was obtained.

EXAMPLE XXI

A mixture of 2 g. of 2-hydroxymethylene-17α-methyl-androstan-17β-ol-3-one, 100 ml. of absolute methyl iodide, 100 ml. of anhydrous acetone and 2 g. of anhydrous powdered potassium carbonate was refluxed for 48 hours and then poured into water. The product was extracted with ether, the ether extract was washed with water, dried over anhydrous sodium sulfate and evaporated to dryness. The residue was purified by chromatography on washed alumina giving 2-methoxymethylene-17α-methyl-androstan-17β-ol-3-one. Alternatively, the 2-methoxy derivative was prepared by treatment of the hydroxymethylene compound with methanol-perchloric acid as desribed in Example XIX.

1 g. of the foregoing compound was hydrogenated in accordance to the method described in Example XIX, yielding 2α-methoxymethyl-17α-methyl-androstan-17β-ol-3-one.

EXAMPLE XXII

2 - hydroxymethylene - 17α - methyl - 19 - nor - androstan-17β-ol-3-one was converted to 2-methoxymethylene - 17α - methyl - 19 - nor -androstan - 17β - ol - 3-one in accordance with the method of Example XIX and alternatively in accordance with the method of Example XXI. Hydrogenation over a palladium on carbon catalyst as in Example XIX converted 2-methoxymethylene-17α - methyl - 19 - nor -androstan - 17β - ol - 3 - one to 2α - methoxymethyl - 17α - methyl - 19 - nor -androstan-17β-ol-3-one.

EXAMPLE XXIII 10 g. of 2-hydroxymethylen-androstan-17β-ol-3-one were suspended in 100 ml. of ethanol and 2 drops of 70% perchloric acid were added at 20° C.; the mixture was stirred at this temperature, whereby rapidly dissolution of the starting steroid, followed by precipitation of the etherified compound was noted. The mixture was then left for 10 minutes at 20° C., subsequently chilled to 0° C. and the solid collected by filtration, water-washed, dried and purified by crystallization from acetone-hexane. Thus, 2 - ethoxymethylen - androstan - 17β - ol - 3-one was obtained. This compound, in its turn, was hydrogenated, exactly as described for the hydrogenation of 2-methoxymethylene-androstan-17β-ol-3-one (Example XIX) and 2α-ethoxymethyl-androstan-17β-ol-3-one was obtained.

EXAMPLE XXIV

Exactly as described in Example XXIII, 2-hydroxymethylene-19-nor-androstan-17β-ol-3-one was etherified by reaction with ethanol in the presence of perchloric acid and the resulting 2-ethoxymethylene-19-nor-androstan-17β-ol-3-one was hydrogenated, thus furnishing finally 2α - ethoxymethyl - 19 - nor -androstan - 17β - ol - 3-one.

EXAMPLE XXV

By starting with the 2-hydroxymethylene-derivatives of dihydroallotestosterone, 19 - nor - dihydroallotestosterone and 17α-alkyl substituted derivatives thereof listed under A, the etherification procedures described in Examples XIX, XXI and XXIII were repeated, except that ethyl iodide, propyl iodide or benzyl iodide, respectively, were employed instead of methyl iodide. Thus by the use of ethyl iodide, the corresponding 2-ethoxymethylene-compounds, by applying propyl iodide the respective 2-propoxymethylene compounds, and using benzyl iodide the respective 2-benzyloxymethylene compounds were obtained, as intermediates.

The etherified 2-hydroxymethylene compounds were hydrogenated, exactly as reported in Example XIX, and thus the desired final etherified 2α-hydroxymethyl compounds, listed under C were produced.

| A Starting Compound | B Intermediate Ether | C Final Compound |
|---|---|---|
| 2-hydroxymethylen-androstan-17β-ol-3-one. | ethyl etherification procedure of Example XXI. | 2α-ethoxymethyl-androstan-17β-ol-3-one. |
| 2-hydroxymethylene-17α-methyl-androstan-17β-ol-3-one (Example XXI). | ethyl (etherification procedure of Examples XXIII and XXI). | 2α-ethoxymethyl-17α-methyl-androstan-17β-ol-3-one. |
| 2-hydroxymethylen-androstan-17β-ol-3-one (Example XIX). | propyl (etherification procedure of Example XXI). | 2α-propoxymethyl-androstan-17β-ol-3-one. |
| 2-hydroxymethylene-17α-ethyl-androstan-17β-ol-3-one (U.S. Patent 2,908,693). | methyl (etherification procedures of Examples XIX and XXI). | 2α-methoxymethyl-17α-ethyl-androstan-17β-ol-3-one. |
| 2-hydroxymethylene-19-nor-androstan-17β-ol-3-one (Example XX). | benzyl (etherification procedure of Example XXI). | 2α-benzyloxymethyl-19-nor-androstan-17β-ol-3-one. |
| 2-hydroxymethylene-17α-ethyl-19-nor-androstan-17β-ol-3-one (Preparation 7). | methyl (etherification procedure of Examples XIX and XXI). | 2α-methoxymethyl-17α-ethyl-19-nor-androstan-17β-ol-3-one. |
| 2-hydroxymethylene-17α-propyl-19-nor-androstan-17β-ol-3-one. | ethyl (procedure of Example XXI). | 2α-ethoxymethyl-17α-propyl-19-nor-androstan-17β-ol-3-one. |
| 2-hydroxymethylen-androstan-17β-ol-3-one. | benzyl (procedure of Example XXI). | 2α-benzyloxymethyl-androstan-17β-ol-3-one. |
| 2-hydroxymethylen-17α-propyl-androstan-17β-ol-3-one (U.S. Patent 2,908,693). | ____do_____ | 2α-benzyloxymethyl-17α-propyl-androstan-17β-ol-3-one. |

EXAMPLE XXVI

In the preceding Examples XIX and XXV, the hydrogenation step was modified in such a manner that the etherified 2-hydroxymethylene compound was hydrogenated in ethanol, at room temperature, at atmospheric pressure and in the presence of a pre-reduced 5% palladium on barium sulfate catalyst, up to the uptake of 1 molecular equivalent of hydrogen. More particularly, thus 2-methoxymethylen-androstan-17β-ol-3-one (Example XIX) was converted into 2α-methoxymethyl-androstan-17β-ol-3-one, and 2-benzyloxymethylene-19-nor-androstan-17β-ol-3-one (Example XXV) to 2α-benzyloxymethyl-19-nor-androstan-17β-ol-3-one.

EXAMPLE XXVII 1 g. of 2-methoxymethylen-androstan-17β-ol-3-one, as prepared by the procedure of Example XIX was treated with 1 ml. of acetic anhydride in 5 ml. of pyridine at room temperature and overnight, poured into water, the product extracted with ether, the extract washed consecutively with diluted hydrochloric acid, water, aqueous sodium bicarbonate and water, and the ether evaporated. The residue was crystallized from acetone-hexane to give 2 - methoxymethylen - 17β - acetoxyandrostan-3-one. By subsequent hydrogenation, in accordance to Example XIX, the 17-acetate of 2α-methoxymethyl-androstan-17β-ol-3-one was obtained. The same product was produced by direct acetylation of 2α-methoxymethy-androstan-17β-ol-3-one, prepared in accordance to Example XIX.

EXAMPLE XXVIII 1 g. of 2-benzyloxymethylene-androstan-17β-ol-3-one (compare Example XXV) was treated with 2 ml. of propionic anhydride in 5 ml. of pyridine, at room temperature overnight. The mixture was poured into water, heated on the steam bath for 1 hour, chilled and ether-extracted. The product was then worked up as described in Example XXVII. Thus 2-benzyloxymethylene-androstan-17β-ol-3-one-propionate was obtained. Subsequent hydrogenation effected exactly as described in Example XIX, yielded 2α-benzyloxymethyl-androstan-17β-ol-3-one propionate. The same produce was obtained by a similar treatment of 2α-benzyloxymethyl-androstan-17β-ol-3-one (Example XXV) with propionic anhydride.

EXAMPLE XXIX

Exactly as described in Example XXVII, the 17β-hydroxyl group of 2-methoxymethylene-19-nor-androstan-17β-ol-3-one (Example XX) was reacted with acetic anhydride to yield 2-methoxymethylene-19-nor-androstan-17β-ol-3-one acetate, and this compound, in its turn, was hydrogenated to furnish 2α-methoxymethyl - 19 - nor-androstan-17β-ol-3-one acetate. Furthermore, also in accordance with the procedure reported in Example XXVII, 2α-methoxymethyl-19-nor-androstan-17β-ol-3-one (Example XX) was acetylated to give 2α-methoxymethyl-19-nor-androstan-17β-ol-3-one acetate.

I claim:

1. A compound of the following formula:

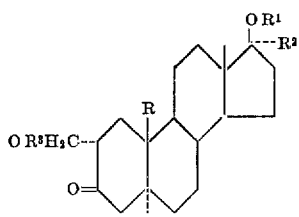

wherein R is selected from the group consisting of hydrogen and methyl; R¹ is selected from the group consisting of hydrogen and a hydrocarbon carboxylic acyl radical of less than 12 carbon atoms; R² is selected from the group consisting of hydrogen and a lower alkyl radical; and R³ is selected from the group consisting of hydrogen, lower alkyl, monocyclic aralkyl containing up to 12 carbon atoms and a hydrocarbon carboxylic acyl group of less than 12 carbon atoms.

2. 2α - hydroxymethyl - 17α-methyl-androstan-17β-ol-3-one.

3. 2α-methoxymethyl-androstan-17β-ol-3-one.

4. 2α-methoxymethyl-19-nor-androstan-17β-ol-3-one.

5. 2α - acetoxymethyl - 17α-methyl-androstan-17β-ol-3-one.

6. The hydrocarbon carboxylic acid esters of less than 12 carbon atoms of 2α-hydroxymethyl-androstan-17β-ol-3-one.

7. The hydrocarbon carboxylic acid esters of less than 12 carbon atoms of 2α-lower alkoxymethyl-androstan-17β-ol-3-one.

8. The hydrocarbon carboxylic acid esters of less than 12 carbon atoms of 2α-monocyclic aralkoxymethyl-androstan-17β-ol-3-one.

9. The hydrocarbon carboxylic acid esters of less than 12 carbon atoms of 2α-hydroxymethyl-17α-lower alkyl-androstan-17β-ol-3-one.

10. The hydrocarbon carboxylic acid esters of less than 12 carbon atoms of 2α-lower alkoxymethyl-17α-lower alkyl-androstan-17β-ol-3-one.

11. The hydrocarbon carboxylic acid esters of less than 12 carbon atoms of 2α-monocyclic aralkoxymethyl-17α-lower alkyl-androstan-17β-ol-3-one.

12. The hydrocarbon carboxylic acid esters of less than 12 carbon atoms of 2α-hydroxymethyl-19-nor-androstan-17β-ol-3-one.

13. The hydrocarbon carboxylic acid esters of less than 12 carbon atoms of 2α-lower alkoxymethyl-19-nor-androstan-17β-ol-3-one.

14. The hydrocarbon carboxylic acid esters of less than 12 carbon atoms of 2α-monocyclic aralkoxymethyl-19-nor-androstan-17β-ol-3-one.

15. The hydrocarbon carboxylic acid esters of less than 12 carbon atoms of 2α-hydroxymethyl-17α-lower alkyl-19-nor-androstan-17β-ol-3-one.

16. The hydrocarbon carboxylic acid esters of less than 12 carbon atoms of 2α-lower alkoxymethyl-17α-lower alkyl-19-nor-androstan-17β-ol-3-one.

17. The hydrocarbon carboxylic acid esters of less than 12 carbon atoms of 2α-monocyclic aralkoxymethyl-17α-lower alkyl-19-nor-androstan-17β-ol-3-one.

18. In the process of producing a compound of the following formula:

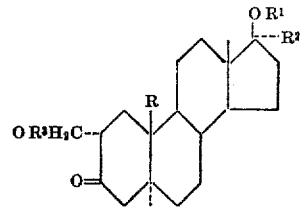

wherein R is selected from the group consisting of hydrogen and methyl; R¹ is selected from the group consisting of hydrogen and a hydrocarbon carboxylic acyl radical of less than 12 carbon atoms; R² is selected from the group consisting of hydrogen and a lower alkyl radical and R³ is selected from the group consisting of hydrogen, lower alkyl, monocyclic aralkyl containing up to 12 carbon atoms and a hydrocarbon carboxylic acyl group of less than 12 carbon atoms, the step comprising hydrogenating a compound of the following formula

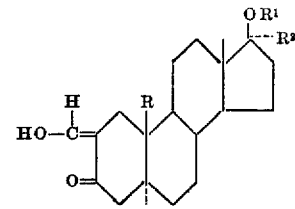

wherein R, R¹ and R² have the same definition as above in an inert solvent at a pH of 6.9 to 7.2.

No references cited.